US 9,264,095 B2

(12) United States Patent
Friedrich et al.

(10) Patent No.: US 9,264,095 B2
(45) Date of Patent: Feb. 16, 2016

(54) ULTRA-WIDEBAND SIGNAL AMPLIFIER

(75) Inventors: Martin Friedrich, Gelsenkirchen (DE);
Christian Grewing, Sollentuna (SE);
Giuseppe Li Puma, Bochum (DE);
Christoph Sandner, Villach (AT);
Andreas Wiesbauer, Pörtschach (AT);
Kay Winterberg, Kempen (DE); Stefan Van Waasen, Sollentuna (SE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 871 days.

(21) Appl. No.: 13/323,909

(22) Filed: Dec. 13, 2011

(65) Prior Publication Data
US 2012/0082186 A1    Apr. 5, 2012

Related U.S. Application Data

(63) Continuation of application No. 11/118,622, filed on Apr. 29, 2005, now Pat. No. 8,094,752.

(30) Foreign Application Priority Data

Apr. 29, 2004    (DE) .................... 10 2004 021 153

(51) Int. Cl.
*H04L 27/04*    (2006.01)
*H04B 1/69*    (2011.01)

(52) U.S. Cl.
CPC ........................... *H04B 1/69* (2013.01)

(58) Field of Classification Search
CPC ........................................................ H04B 1/69
See application file for complete search history.

(56) References Cited

U.S. PATENT DOCUMENTS

| 6,034,565 | A | 3/2000 | Schweighofer | |
|---|---|---|---|---|
| 6,424,222 | B1* | 7/2002 | Jeong et al. | 330/285 |
| 6,816,714 | B2 | 11/2004 | Toncich | |
| 6,850,753 | B2 | 2/2005 | Zhang et al. | |
| 7,203,472 | B2 | 4/2007 | Seppinen et al. | |
| 8,094,752 | B2* | 1/2012 | Friedrich et al. | 375/318 |
| 2002/0105384 | A1* | 8/2002 | Dent | 330/302 |
| 2003/0199259 | A1 | 10/2003 | Macedo et al. | |
| 2004/0130398 | A1* | 7/2004 | Franca-Neto | 330/311 |
| 2005/0227627 | A1 | 10/2005 | Cyr et al. | |
| 2005/0261797 | A1* | 11/2005 | Cyr et al. | 700/121 |

(Continued)

OTHER PUBLICATIONS

Office Action dated Apr. 15, 2008 issued to U.S. Appl. No. 11/118,622.
Office Action dated Nov. 13, 2008 issued to U.S. Appl. No. 11/118,622.
Office Action dated Nov. 5, 2009 issued to U.S. Appl. No. 11/118,622.

(Continued)

*Primary Examiner* — Kenneth Lam

(57) ABSTRACT

Amplifier for an ultra-wideband (UWB) signal receiver having a signal input (15) for receiving an ultra-wideband signal which is sent by a transmitter (1) and which is transmitted in a sequence of transmission channels ($K_i$) (which each have a particular frequency bandwidth) which has been agreed between the transmitter (1) and the receiver (4); a transistor (18) whose control connection is connected to the signal input (15); a resonant circuit (26, 30, 31) which is connected to the transistor (18) and whose resonant frequency can be set for the purpose of selecting the transmission channel ($K_i$) in line with the agreed sequence of transmission channels; and having a signal output (29) for outputting the amplified ultra-wideband signal, the signal output being tapped off between the transistor (18) and the resonant circuit.

20 Claims, 4 Drawing Sheets

(56) References Cited

U.S. PATENT DOCUMENTS

| | | |
|---|---|---|
| 2006/0261892 A1 | 11/2006 | Sutardja |
| 2007/0001769 A1 | 1/2007 | Roach |
| 2007/0032198 A1 | 2/2007 | Sakamoto |
| 2007/0060152 A1 | 3/2007 | Sakamoto |

OTHER PUBLICATIONS

Office Action dated May 26, 2010 issued to U.S. Appl. No. 11/118,622.

Notice of Allowance dated Sep. 12, 2011 issued to U.S. Appl. No. 11/118,622.

* cited by examiner

LINEAR AND LOW-NOISE RF AMPLIFIERS

PRIOR ART

ULTRA-WIDEBAND SIGNAL AMPLIFIER

FIELD

The invention relates to an amplifier for an ultra-wideband (UWB) signal amplifier.

BACKGROUND

UWB (Ultra Wide Band) technology is capable of transmitting data at a high data transmission rate within a limited range.

The channel capacity is dependent on the available channel bandwidth. In line with Shannon's equation, the channel capacity is calculated as: C=BWLOG 2(1+SNR) where C is the channel capacity in bits per second, BW is the available channel bandwidth in Hz, and SNR is the signal-to-noise ratio.

Ultra-wideband (UWB) technology provides a very high level of frequency bandwidth. First-generation UWB systems provide a frequency bandwidth of between 3.1 and 5 GHz, and UWB systems from subsequent generations provide a frequency bandwidth of between 3.1 and 10.6 or between 3.1 and 8 GHz. The high level of available channel bandwidth means that the transmission capacity is very high. The low signal transmission powers means that the range of UWB transmitters is relatively short and is no more than 10 meters.

FIG. 1 shows a UWB arrangement based on the prior art. A transmitter uses a transmission antenna to send a UWB signal to a reception antenna on a receiver. The UWB receiver contains a bandpass filter BPF which allows signals to pass in the admissible spectrum of the UWB system, for example in a frequency range between 3.1 and 10.6 GHz. The UWB received signal is then amplified by a wideband amplifier with little noise output. The wideband LNA (Low Noise Amplifier) has its output connected to the signal processing circuit in the receiver.

FIG. 2 shows a wideband LNA based on the prior art, as is described in R. Gilmore and L. Besser "Practical RF Circuit Design for modern Wireless Systems", volume II Active Circuits and Systems ISBN 1-58053-522-4. The wideband signal amplifier for amplifying the UWB received signal based on the prior art is designed such that it amplifies the entire UWB signal spectrum in a frequency range between 3.1 and 10.6 GHz, for example. The very high frequency range which needs to be amplified uniformly by the wideband amplifier means that the circuit complexity for such a wideband LNA based on the prior art is very high. In addition, the wideband LNA based on the prior art has the drawback that it has a very high power consumption.

In the case of ultra-wideband systems based on the prior art, there are two fundamentally different embodiments. In DSS (Direct Spread Spectrum) UWB systems, the entire wideband frequency spectrum is used for transmitting the UWB signal. In a multiband UWB system, the wideband frequency spectrum, which ranges from 3.1 to 10.6 GHz, for example, is divided into frequency bands which have a minimum bandwidth of 500 MHz. In the case of this multiband UWB, the transmitter transmits the UWB transmission signal in different frequency bands or channels in line with a prescribed frequency hopping scheme, which is also known to the associated receiver. If the entire UWB frequency band, which ranges from 3.1 to 10.6 GHz, is divided into 15 frequency bands, for example, i.e. 15 different transmission channels, the transmitter hops to and fro between the various channels K.sub.i during transmission in line with a prescribed signal hopping scheme. By way of example, the transmitter hops to the channel K.sub.2, then to channel K.sub.3, then to channel K.sub.7 and finally back to channel K.sub.2. The channel hopping scheme in question is then K.sub.2, K.sub.3, K.sub.7.

In this case, the transmission channel hopping scheme may comprise all or just some of the possible transmission channels.

To date, multiband UWB receivers based on the prior art have also used wideband signal amplifiers which have the aforementioned drawbacks, such as high circuit complexity and high power consumption.

It is therefore the object of the present invention to provide a signal amplifier for a UWB receiver which is simple to implement in terms of circuitry and has a low power consumption.

The invention achieves this object by means of an amplifier having the features cited in patent claim 1.

The invention provides an amplifier for an ultra-wideband (UWB) signal receiver having a signal input for receiving an ultra-wideband signal which is sent by a transmitter and which is transmitted in a sequence of transmission channels (which each have a particular frequency bandwidth) which has been agreed between the transmitter and the receiver, a transistor whose control connection is connected to the signal input, a resonant circuit which is connected to the transistor and whose resonant frequency can be set for the purpose of selecting the transmission channel in line with the agreed sequence of transmission channels, and having a signal output for outputting the amplified ultra-wideband signal, the signal output being tapped off between the transistor and the resonant circuit.

In one preferred embodiment of the inventive amplifier, the resonant circuit has a coil and a plurality of capacitors which are connected in parallel.

In this case, each capacitor is preferably connected to a controllable switch.

The switches are preferably switched on the basis of a control signal which is output by a control device.

In one preferred embodiment of the inventive amplifier, a cascode stage is provided between the transistor and the signal output.

In a first embodiment of the inventive amplifier, the transistors are MOS field-effect transistors.

In an alternative embodiment of the inventive amplifier, transistors are bipolar transistors.

In one preferred embodiment of the inventive amplifier, the frequency bandwidth of a transmission channel is approximately 500 MHz.

The transmission channel sequence is preferably agreed between the transmitter and the receiver in an initialization mode.

In one preferred embodiment, a memory device is provided which is used for storing the agreed transmission channel sequence.

In one preferred embodiment, the receiver has a controller which applies signal control words to an internal decoding circuit in the amplifier in line with the stored transmission channel sequence.

The decoding circuit preferably actuates the controllable switches to change the resonant frequency of the resonant circuit.

In one preferred embodiment, a matching circuit for matching the input impedance of the amplifier to the impedance of a reception antenna on the receiver is provided at the signal input of the amplifier.

In one preferred embodiment, the impedance matching is performed by the matching circuit on the basis of the channel control words which are applied by the controller.

In one particularly preferred embodiment of the inventive amplifier, the amplifier is of fully differential design.

The text below describes preferred embodiments of the inventive amplifier with reference to the appended figures in order to explain features which are fundamental to the invention.

DETAILED DESCRIPTION

Figure 1:
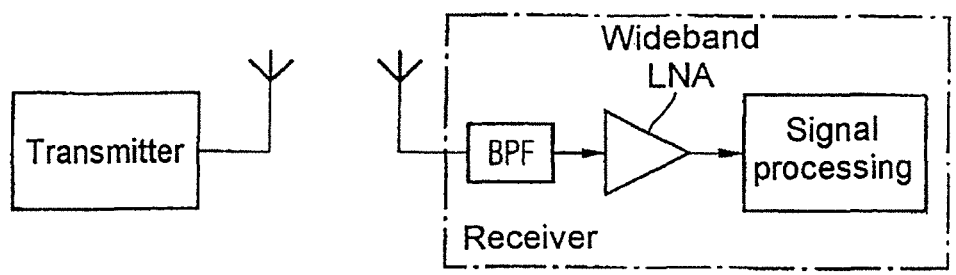
FIG. 1 shows a UWB circuit arrangement based on the prior art.
Figure 2:
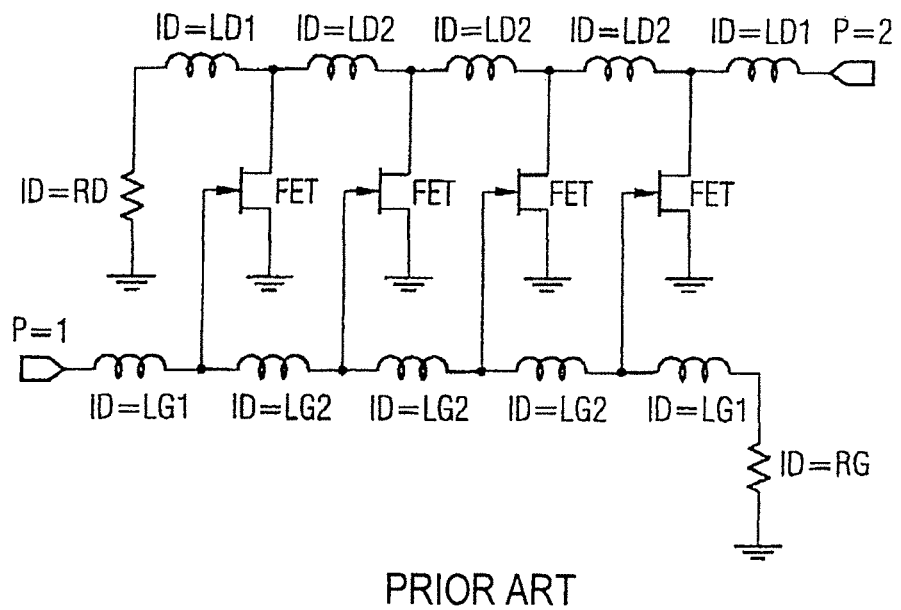
FIG. 2 shows a UWB wideband signal amplifier based on the prior art.
Figure 3:
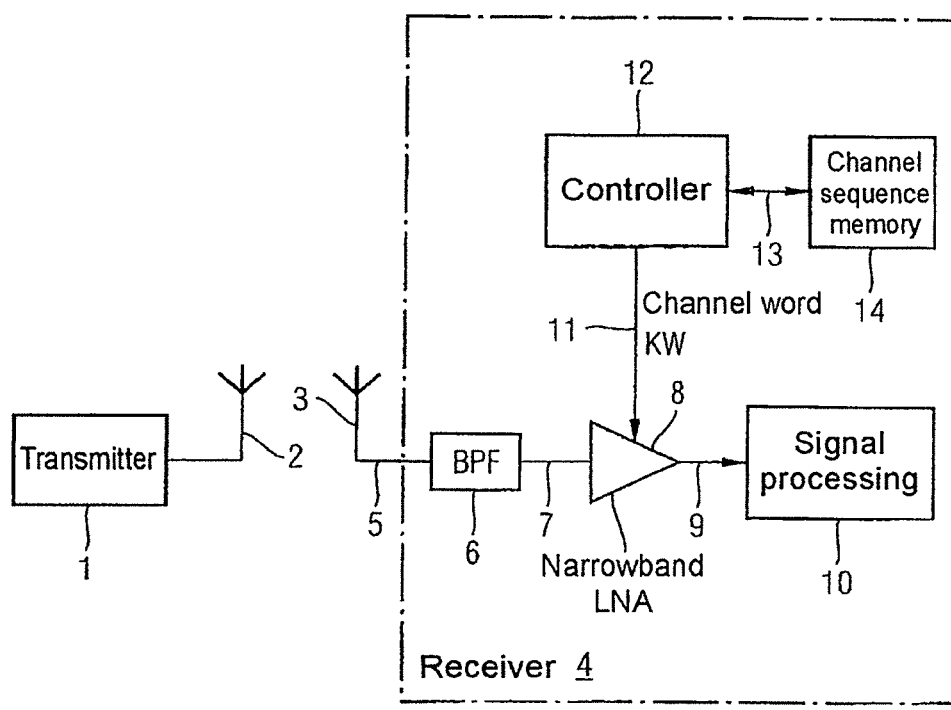
FIG. 3 shows a UWB circuit arrangement based on the invention.

FIG. 3 shows a UWB circuit arrangement based on the invention. A transmitter 1 uses a transmission antenna 2 to send a UWB signal to a reception antenna 3 on a UWB receiver 4. The reception antenna 3 is connected to a bandpass filter 6 in the receiver 4 via a line 5. The bandpass filter 6 preferably filters all signals outside of the UWB frequency range, which extends from 3.1 to 10.6 GHz, for example, in order to suppress noise. The output of the bandpass filter 6 is connected to the inventive UWB narrowband signal amplifier 8 via a line 7. The amplifier 8 outputs the amplified signal via a line 9 to a signal processing circuit 10 within the receiver 4. The narrowband amplifier 8 receives a control signal from an internal controller 12 in the receiver 4 via control lines 11, the control signal being a channel word which indicates that transmission channel in which the UWB signal is currently being sent by the transmitter 1. The controller 12 is connected to an integrated channel sequence memory 14 in the receiver 4 via lines 13. The channel sequence memory 14 stores the sequence of transmission channels which has been agreed between the transmitter 1 and the receiver 4.

In an initialization phase or in an initialization mode, the transmitter 1 and the receiver 4 agree a particular sequence of transmission channels. To this end, the UWB frequency band, which extends from 3.1 to 10.6 GHz, for example, is divided into frequency bands having a width of 500 MHz each, and is allocated to corresponding channels. In an initialization mode, the transmitter 1 transmits the desired channel sequence in which it will send the UWB transmission signal to the receiver 4 cyclically in future. An example of such a transmission channel sequence is $K_2$, $K_1$, $K_3$, $K_7$, $K_2$ The channel sequence is agreed between the transmitter 1 and the receiver 4. In a search mode, the receiver 4 checks all transmission channels until it has found a suitable transmitter 1. This can be done relatively quickly in a UWB system when there are 15 data transmission channels, for example, which means that the power consumption is relatively low in this search mode. When the receiver 4 has found the associated transmitter 1 in the search mode, it receives from the transmitter 1 the transmitted UWB signal, with the receiver 4 hopping to and fro between the various frequency bands in line with the agreed channel sequence in order to operate in sync with the receiver 1. To this end, the inventive narrowband signal amplifier 8 receives a channel word KW indicating the respective present transmission channel from the controller 12 via the control lines 11.

Figure 4:
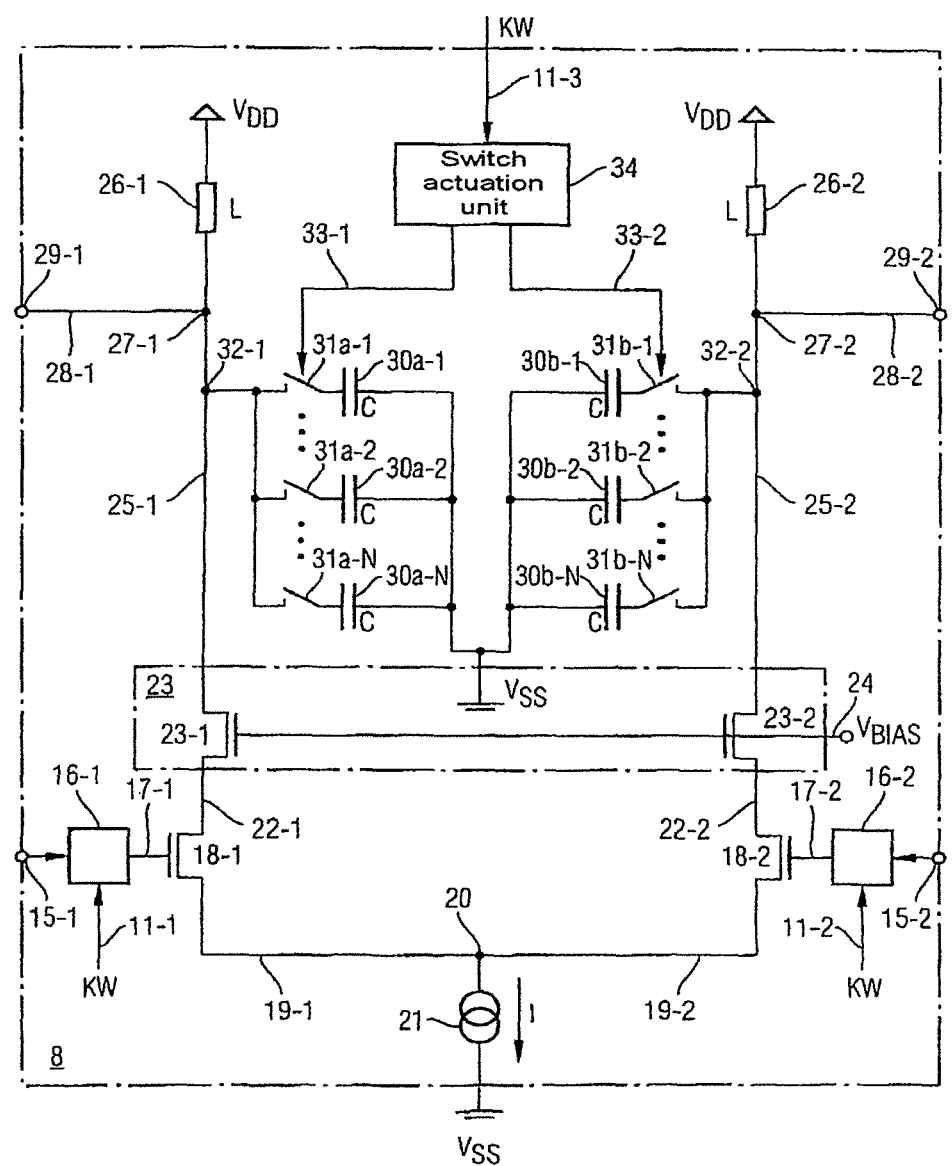
FIG. 4 shows a preferred embodiment of the inventive narrowband UWB signal amplifier.

FIG. 4 shows a preferred embodiment of the inventive narrowband signal amplifier 8.

In line with the preferred embodiment shown in FIG. 4, the signal amplifier 8 is of fully differential design. The signal amplifier 8 has a signal input with two signal input connections 15-1, 15-2. The applied differential input signal, which is applied to the signal input 15 of the narrow band amplifier 8 by the bandpass filter 6 via the lines 7, is sent to a matching circuit 16-1, 16-2 within the amplifier 8. The matching circuit 16 matches the input impedance of the amplifier 8 to the impedance of the reception antenna 3 on the receiver 4. The impedance matching takes place in frequency-dependent fashion and in line with the respective present transmission channel. To this end, the impedance matching circuit 16 receives the channel word KW from the controller 12 via the control lines 11. In one preferred embodiment, the matching circuit 16-2 may have additional filters for noise-signal matching. The matching circuit 16-1, 16-2 in the embodiment shown in FIG. 4 is connected to a gate connection of NMOS field-effect transistors 18-1, 18-2 via lines 17-1, 17-2. The NMOS transistors 18-1, 18-2 are connected to one another at a node 20 via lines 19-1, 19-2, the node 20 being connected to a current source 21. The current source 21 delivers a constant current which is offloaded to a negative supply voltage $V_{ss}$.

The NMOS transistors 18-1, 18-2 are connected via lines 22-1, 22-2 to series-connected NMOS transistors 23-1, 23-2 whose gate connections receive a bias voltage $V_{Bias}$ via a line 24. The NMOS transistors 23-1, 23-2 form a cascode stage 22 in the amplifier 8. The cascode stage 23 is connected via lines 25-1, 25-2 to coils or inductors 26-1, 26-2 which are supplied by a positive supply voltage VDD. At branching nodes 27-1, 27-2, the output signal from the amplifier 8 is tapped off. The branching nodes 27-1, 27-2 are connected to the output signal connections 29-1, 29-2 of the amplifier 8 via internal lines 28-1, 28-2.

The amplifier 8 also contains capacitors $30a$-1 ... $30a$-$n$; $30b$-1 ... $30b$-$n$ which can be connected to branching nodes 32-1, 32-2 in the amplifier 8 by means of associated controllable switches 31. One side of the capacitors 30 has the negative supply voltage $V_{SS}$ applied to it. The controllable switches 31 are actuated by an internal switch actuation logic unit 34 via control lines 33-1, 33-1. The switch actuation logic unit 34 codes the channel word KW which is present on the control line 11-3.

The UWB signal amplifier 8 of fully differential design which is shown in FIG. 4 has a first resonant circuit, which is formed by the coil 26-1 and the capacitors $30a$, and a second resonant circuit, which is formed by the coil 26-2 and the capacitors $30b$. The two resonant circuits are of identical design. The resonant frequency of the two resonant circuits is set on the basis of the applied channel word KW for the purpose of selecting the transmission channel in line with the agreed sequence of transmission channels $K_i$.

Figure 5:
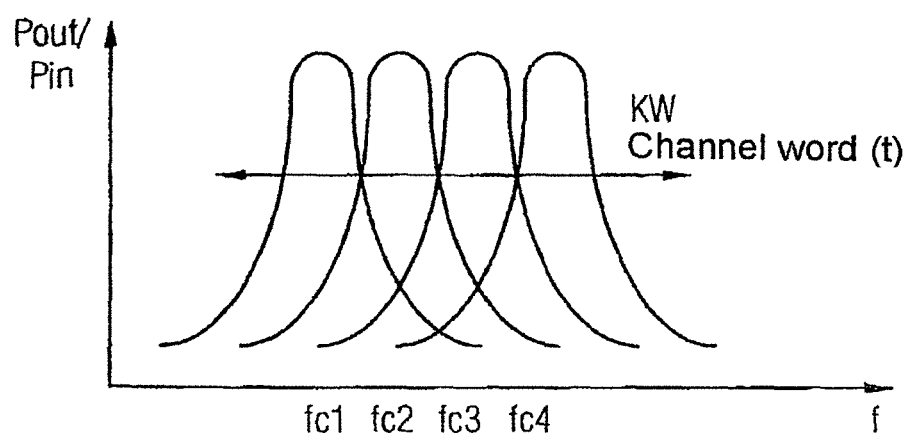
FIG. 5 shows a graph to explain the way in which the inventive narrowband UWB signal amplifier works.

FIG. 5 shows the ratio of the output power to the input power of the inventive narrowband UWB signal amplifier for various resonant frequencies $f_c$, with the resonant frequency of the resonant circuits being shifted on the basis of the channel word KW. The frequency bandwidth of the resonant circuit is preferably the same as the frequency bandwidth of a transmission channel, for example 500 MHz. The high transmission frequencies of the UWB systems mean that the coils 26-1, 26-2 can be integrated in the form of spirally arranged conductor tracks, for example.

The circuit complexity for the inventive UWB signal amplifier 8 shown in FIG. 4 is relatively low. The small number of required components means that also the power consumption of the inventive signal amplifier 8 is low.

The invention claimed is:

1. An amplifier for an ultra-wideband signal receiver having:
   a signal input for receiving an ultra-wideband signal transmitted in a predetermined sequence of transmission channels;
   an amplifier element having an input connection coupled to the signal input, and an output;
   a resonant circuit connected to the output of the amplifier element, the resonant circuit comprising at least one inductance connected to an adjustable capacitance circuit, wherein the resonant circuit is configured to exhibit an adjustable resonant frequency, the adjustable resonant frequency adjusted according to a control signal to select a channel from the predetermined sequence of transmission channels;
   wherein the control signal is driven by data associated with the predetermined sequence of transmission channels;
   wherein the amplifier element is operable to amplify the ultra-wideband signal provided at the signal input in a plurality of differing frequency bands in an order dictated by the predetermined sequence of transmission channels; and
   a signal output configured to provide the amplified ultra-wideband signal.

2. The amplifier of claim 1, wherein the amplifier element comprises a transistor.

3. The amplifier of claim 1, wherein the adjustable capacitance comprises:
   an adjustable capacitance circuit having a plurality of capacitors connected to branching nodes by associated controllable switches; and
   a switch actuation logic unit that controls the controllable switches according to the control signal.

4. The amplifier of claim 3, wherein the control signal comprises a channel word.

5. The amplifier of claim 1, further comprising a memory operably coupled to the amplifier, and configured to store information relating to the predetermined sequence of transmission channels.

6. The amplifier of claim 5, wherein a retrieval of the information stored in the memory dictates a content of the control signal.

7. The amplifier according to claim 6, further comprising a controller operably configured to adjust the adjustable resonant frequency, wherein the controller is configured to retrieve the information stored in the memory and generate the control signal in response thereto.

8. The amplifier according to claim 7, wherein:
   the controller is operably connected to provide a plurality of control signals to a switch actuation unit operably associated with the resonant circuit, the control signals based on the transmission channel sequence;
   the resonant circuit includes a plurality of capacitors coupled in series with corresponding switches; and
   the switch actuation unit is operable to controllably actuate the switches in accordance with the control signals.

9. The amplifier according to claim 1, further comprising a cascade stage operably coupled between the amplifier element and the signal output.

10. The amplifier according to claim 1, wherein the amplifier element comprises a MOS field-effect transistor.

11. The amplifier according to claim 1, wherein the amplifier element comprises a bipolar transistor.

12. The amplifier according to claim 1, wherein the frequency bandwidth of a transmission channel is about 500 MHz.

13. The amplifier according to claim 1, further comprising a matching circuit coupled to the signal input, the matching circuit configured to match an input impedance of the amplifier to an impedance of a reception antenna of the ultra-wideband receiver.

14. The amplifier according to claim 13, wherein the matching circuit is operable to perform variable impedance matching as a function of the transmission channel sequence.

15. An amplifier for an ultra-wideband signal receiver having:
   a differential signal input for receiving an ultra-wideband signal transmitted in a predetermined sequence of transmission channels;
   a first amplification element having an input connection connected to the differential signal input, and having a first output, and a second amplification element having an input connection connected to the differential signal input, and having a second output;
   a first resonant circuit connected to the first output of the first amplification element, the first resonant circuit having a first adjustable resonant frequency, the first adjustable resonant frequency adjusted according to the predetermined sequence of transmission channels;
   a second resonant circuit connected to the second output of the second amplification element, the second resonant circuit having a second adjustable resonant frequency, the second adjustable resonant frequency adjusted according to the predetermined sequence of transmission channels; and
   a differential signal output coupled to the first and second outputs, respectively, and configured to provide the amplified ultra-wideband signal, the differential signal output being tapped off at the first output of the first amplification element, and at the second output of the second amplification element;
   wherein the amplifier is operable to amplify the ultra-wideband signal provided at the differential signal input in a plurality of differing frequency bands in an order dictated by the predetermined sequence of transmission channels.

16. The amplifier according to claim 15, further comprising a memory operably coupled to the amplifier, and configured to store information relating to the predetermined sequence of transmission channels.

17. The amplifier according to claim 15, wherein each of the first and second resonant circuits comprises at least one inductive coil and an adjustable capacitance circuit.

18. The amplifier according to claim 17, wherein each adjustable capacitance circuit includes a plurality of capacitors that are selectively connected in parallel.

19. The amplifier according to claim 18, further comprising a first cascade stage operably coupled between the first amplification element and the differential signal output, and a second cascade stage operably coupled between the second amplification element and the differential signal output.

20. The amplifier according to claim 15, wherein the first and second amplification elements comprise first and second transistors, respectively.

* * * * *